UNITED STATES PATENT OFFICE.

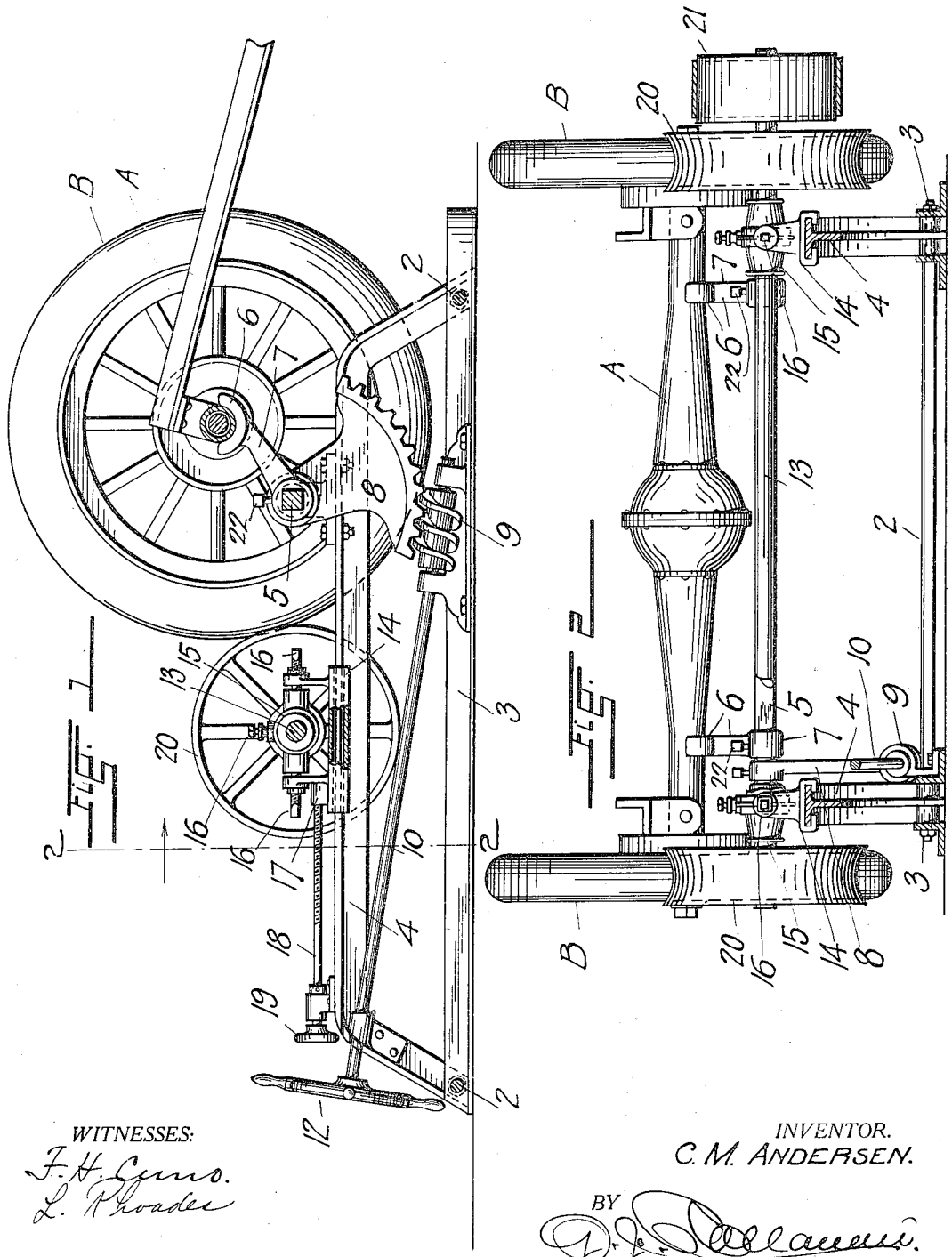

CHARLES M. ANDERSEN, OF DENVER, COLORADO, ASSIGNOR TO AUTO POWER GENERATOR AND APPLIANCE COMPANY, A CORPORATION OF COLORADO.

TRANSMISSION APPARATUS.

1,211,033.  Specification of Letters Patent.  Patented Jan. 2, 1917.

Application filed February 23, 1916. Serial No. 79,939.

*To all whom it may concern:*

Be it known that I, CHARLES M. ANDERSEN, a citizen of the United States, residing at Denver, in the county of Denver and State of Colorado, have invented certain new and useful Improvements in Transmission Apparatus, of which the following is a specification.

My invention relates to power transmission apparatus and more particularly to apparatus adapted for use as an intermediary for the transmission of power from the driven wheels of a motor-vehicle to operate machine tools or other mechanical devices.

The principal object of my invention is to provide a power transmitting apparatus of the character mentioned, in which simplicity of construction is combined with strength and practicability in use and which includes a powerful hand-operated mechanism for raising the rear end of a motor-driven vehicle to bring its driven wheels into engagement with the element of the apparatus which transmits their movement to the tool or machine it is desired to operate.

With the above object in view, my transmission apparatus comprises a transportable structure composed of a pair of rigidly connected rails upon which are mounted for rotation, two parallel shafts one of which carries two adjustable chairs for the support of the axle of a vehicle, and the other one of which is provided with a pair of friction wheels for engagement with the rear wheels of the vehicle, and a pulley for the transmission of its rotary motion to any mechanism it is desired to actuate.

The first-mentioned shaft is connected with a powerful hand-operated movement by which it may be partially rotated in its bearings for the purpose of raising the chairs and the vehicle axle which is seated therein. The second-mentioned shaft is adjustably supported in bearings which are slidable on the rails of the supporting structure to insure the frictional contact of the wheels on the shaft with the vehicle wheels on an axle lifted by rotation of the other shaft, and the pulley carries a belt for the transmission of its rotary motion to a second pulley connected with the machine part to be operated through the intermediary of my improved apparatus.

My invention has been shown in its preferred form in the accompanying drawings in the various views of which like parts are similarly designated, and in which—

Figure 1 is a side elevation of my improved transmission apparatus, showing the operative position of the rear axle and driving wheels of a motor driven vehicle with relation thereto, and Fig. 2, a transverse section taken along the line 2—2, Fig. 1, looking in the direction of the arrow drawn across said line.

Referring more specifically to the drawings, the supporting structure of the apparatus is composed of two parallel side members which are rigidly connected by two rods 2 applied at opposite ends thereof. Each of the side members consists of a runner 3 made of two parallel bars of angle section, and a rail 4 of T-shaped section, the angularly bent end portions of which are secured at their extremities between the angle bars of the runners, by the same rods which as hereinbefore described connect the supporting members of the structure. The shaft 5 which in the operation, serves to raise the rear end of a vehicle for the purpose of placing its wheels B in driving relation to the transmission element of the apparatus, is rotatably mounted in boxes which are secured upon the rails in adjacency to one of their ends. The shaft 5 which preferably has an angular body portion, carries two laterally projecting parallel arms 7 which at their outer extremities are forked to provide chairs 6 for the support of the axle A of a motor-driven vehicle. The arms 7 are slidingly mounted on the angular body-portion of the shaft by means of correspondingly formed hubs and they are secured in their adjusted positions by set-screws 22 extending through threaded apertures in said hubs.

It will be observed that by the means above described, the arms may be readily adjusted on the shaft to adapt the apparatus for use in connection with automobiles of different sizes and constructions. A segmental worm-wheel 8 fixed on the shaft in juxtaposition to one of the side members of the supporting structure, meshes with a worm 9 at the end of a shaft 10 which is slantingly supported in boxes on the said side member. The shaft 10 projects at its upper end beyond the end of the side member on which it is supported, and it is provided at its said end with a hand-wheel 12 for its manual rotation. The shaft 13 which in the operation is rotated by the action of the vehicle wheels raised by a partial rotation of the first-mentioned shaft, is mounted for rotation in bearings composed of carriers 14 which are slidably supported on the rails 4, and boxes 15 which are adjustably suspended between standards on the carriers, through the instrumentality of set-screws 16. The carriers are provided with nuts 17 for the reception of screws 18 which are rotatably supported in bearings at an end of the rails and which are provided with hand-wheels 19 for their manual rotation. It will be seen that by these means, the position of the shaft 13 may be adjusted in any desired direction to insure the frictional contact of its pulleys with the vehicle wheels on an axle supported in the chairs on the shaft 5, and that with the same object in view, the shaft 13 may be moved bodily along the rails, by the adjustment of the carriers on which its boxes are supported.

The wheels 20 which in the operation engage the wheels on an axle supported in the chairs 6, are mounted on the shaft 13 exteriorly of the side members of the supporting structure, and one of the ends of the shaft 13 carries a pulley 21 for the transmission of its rotary movement to a machine-part to be actuated. The wheels 20 may if so desired be dished as shown in Fig. 2 to peripherally fit the tires on the vehicle-wheels.

In the operation of my invention, an automobile is backed toward the apparatus until its rear axle is disposed above the seats on the shaft 5, after which the said shaft is rotated by means of the hand-wheel 12 until the driving wheels on the vehicle axle are engaged by the wheels 20 on the shaft 13.

The character of the lifting mechanism permits of the placement of the vehicle wheels at any elevation required for the proper position of the driving and driven parts with relation to each other, and the adjustments of the boxes in which the shaft 13 is supported, permits of its being moved in any direction required to insure the frictional engagement of both its friction-wheels with the peripheral faces of the tires on the vehicle-wheels.

Having thus described my invention what I claim and desire to secure by Letters-Patent is:

1. Power transmission apparatus comprising in combination, with a supporting structure, a rotary shaft, seats projecting from said shaft for the support of a vehicle axle, a worm-movement adapted for the manual rotation of the shaft, and a rotary friction-element to engage the wheels on a vehicle axle raised by rotation of said shaft.

2. Power-transmission mechanism comprising in combination with a supporting structure, a rotary shaft, seats projecting from said shaft for the support of a vehicle-axle, a segmental worm-gear on said shaft, a worm meshing with said gear, a hand-wheel operatively connected with said worm, and a rotary friction-element to engage the wheels on a vehicle axle raised by rotation of said shaft.

3. Power transmission mechanism comprising in combination with a supporting structure, a movable seat adapted for the support of a vehicle-axle, manually operated mechanism for the elevation of said seat, sliding box-carriers, nuts on said carriers, rotary screws coöperating with said nuts for the adjustment of the carriers, boxes on said carriers, a shaft rotatably supported in said boxes, and friction-wheels on said shaft to engage the wheels on a vehicle-axle raised by movement of said seat.

4. Power transmission apparatus comprising in combination with a supporting structure, a rotary shaft, seats for the support of a vehicle axle, adjustably mounted on said shaft for varying the distance between them, mechanism for rotating the shaft, and a rotary friction element to engage the wheels on a vehicle axle raised by rotation of said shaft.

5. Power transmission mechanism comprising in combination with a supporting-structure, movable seats for the support of a vehicle axle, and manually operated mechanism adapted to move said seats conjunctively for raising or lowering a vehicle axle supported thereon, and to automatically hold said seats in their adjusted positions.

6. Power transmission mechanism comprising in combination with a supporting structure, movable seats for the support of a vehicle axle, and manually operated mechanism adapted to move said seats conjunctively for raising or lowering a vehicle axle supported thereon, and to automatically hold said seats in their adjusted positions, including a driven member in operative connection with said seats, and a driving member mounted on said structure in operative engagement with the driven member.

7. Power transmission mechanism comprising a supporting structure including parallel side-rails, a movable seat on said structure adapted for the support of a vehicle-axle, means for the movement of said seat to raise or lower a vehicle-axle supported therein, box-carriers slidable on said side rails, means adapted to adjust the position of said carriers and to hold them in their adjusted positions, boxes movable on said carriers, means to laterally adjust the position of said boxes on the carriers, a shaft in said boxes and friction-wheels on the shaft to engage the wheels on a vehicle-axle raised by movement of said seat.

In testimony whereof I have affixed my signature in presence of two witnesses.

CHARLES M. ANDERSEN.

Witnesses:
G. J. ROLLANDET,
L. RHOADES.